F. A. BRADSHAW AND C. C. WILLIS.
CLEANER FOR THRESHING MACHINE SCREENS OR RIDDLES.
APPLICATION FILED APR. 12, 1918.
1,331,614.
Patented Feb. 24, 1920.
2 SHEETS—SHEET 1.
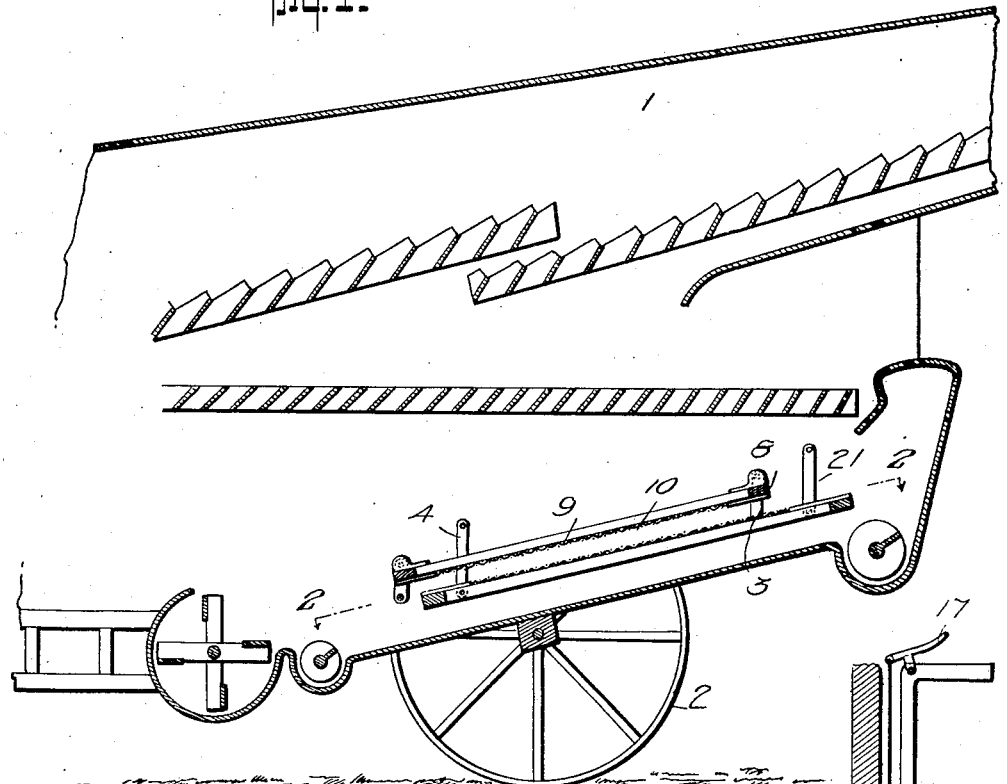
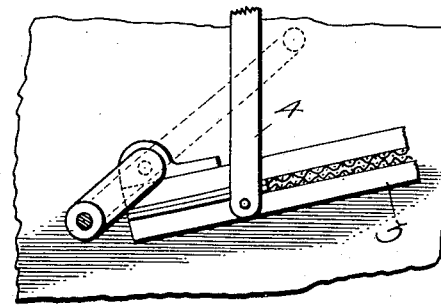
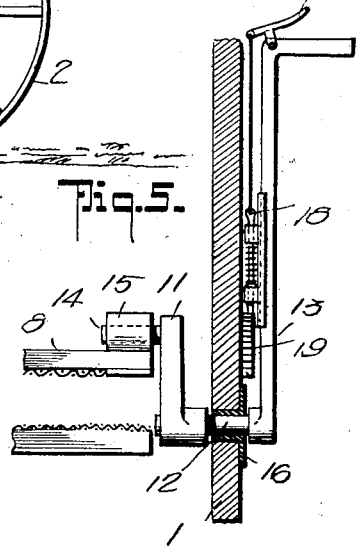
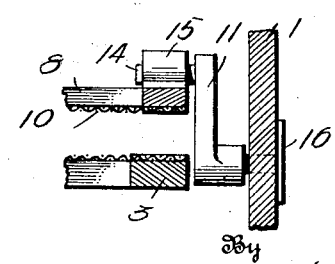
Witness
H. Woodard
Inventors
F. A. Bradshaw
and C. C. Willis
By
Attorneys F. A. BRADSHAW AND C. C. WILLIS.
CLEANER FOR THRESHING MACHINE SCREENS OR RIDDLES.
APPLICATION FILED APR. 12, 1918.
1,331,614. Patented Feb. 24, 1920.
2 SHEETS—SHEET 2.
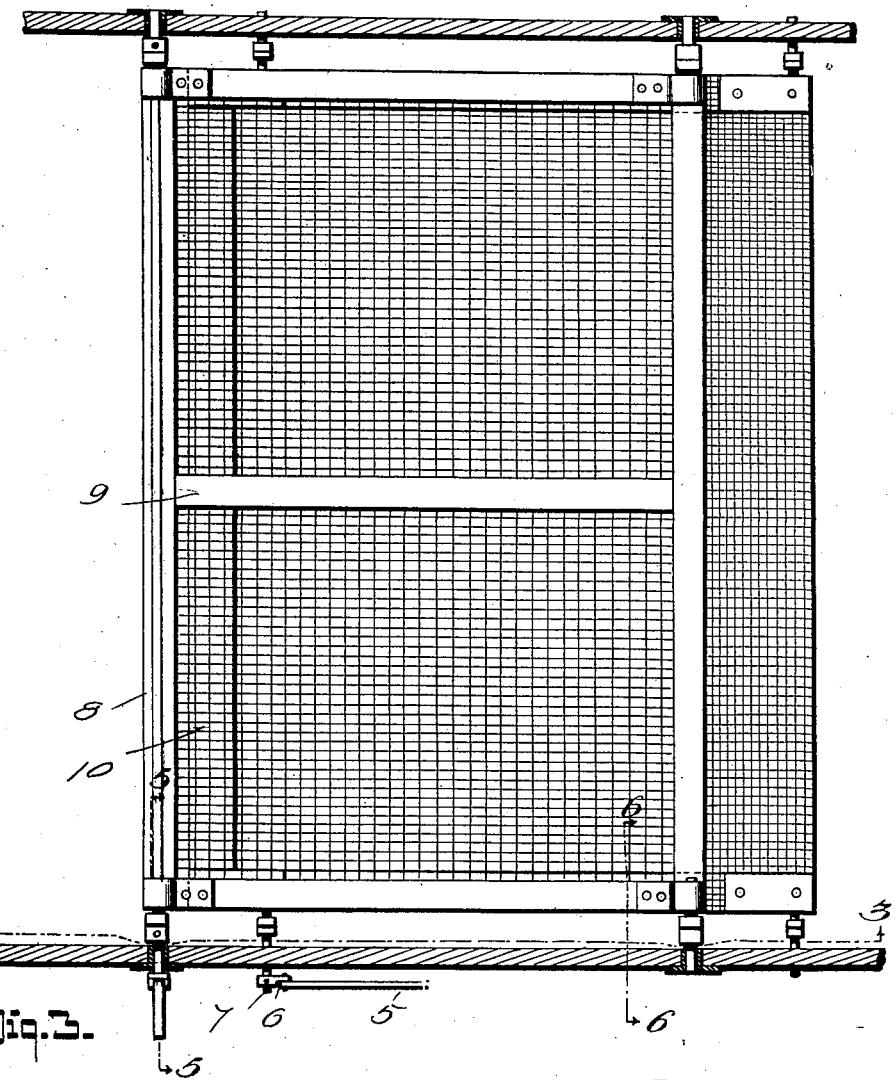
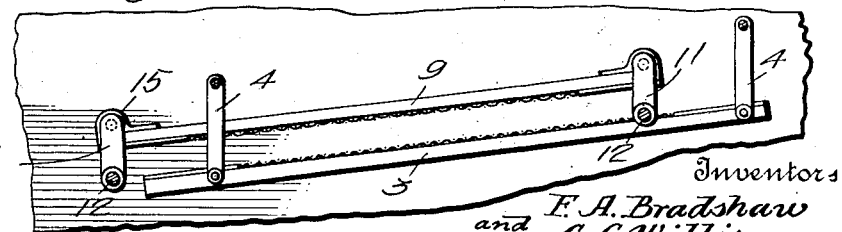

UNITED STATES PATENT OFFICE.

FRANKLIN A. BRADSHAW AND CHARLES C. WILLIS, OF PLAINS, MONTANA.

CLEANER FOR THRESHING-MACHINE SCREENS OR RIDDLES.

1,331,614.  Specification of Letters Patent.  Patented Feb. 24, 1920.

Application filed April 12, 1918. Serial No. 228,152.

*To all whom it may concern:*

Be it known that we, FRANKLIN A. BRADSHAW and CHARLES C. WILLIS, citizens of the United States, and residents of Plains, in the county of Sanders and State of Montana, have invented certain new and useful Improvements in Cleaners for Threshing-Machine Screens or Riddles, of which the following is a specification.

Our invention is an improvement in cleaners for threshing machine screens or riddles, and has for its object to provide mechanism adapted to be arranged within the machine adjacent to the shield or riddle and operable at will to bring it into cleaning position.

In the drawings:

Figure 1 is a partial vertical section of a threshing machine provided with the improved cleaner;

Fig. 2 is a section on the line 2—2 of Fig. 1, looking in the direction of the arrows adjacent to the line;

Fig. 3, 5 and 6 are sections on the lines 3—3, 5—5 and 6—6, respectively, of Fig. 2, each view looking in the direction of the arrows adjacent the line;

Fig. 4 is a view similar to Fig. 3, showing the parts in another position.

The present embodiment of the invention is shown in connection with a threshing machine comprising the usual body 1 supported by the usual wheels 2, and the sieve or screen 3 of the thresher, which is of usual construction, is supported by the usual hangers 4, the said hangers being pivoted at their upper ends to the body and at their lower ends to the screen or riddle.

As is known, the screen is operated to swing by means of a link 5 which is connected with a moving part of the machine at one end and with a crank arm 6 on a shaft 7 to which one of the arms 4 is connected. It will be obvious that when the shaft 7 is rocked the screen will be swung, being longitudinally reciprocated to impart a shaking motion to the same.

The cleaning mechanism comprises a substantially rectangular frame 8 having a cross bar 9 at its center and having a filling 10 of perforate material, as, for instance, wire cloth of suitable mesh and weight. This frame is normally held above the screen in the position shown in Figs. 1 and 2, the said frame being mounted upon the crank arms 11 which are secured to stub shafts 12 journaled in the body of the machine, four of the shafts 12 being provided for this purpose at each corner of the frame.

One of these shafts is provided at its outer end with a crank 13, and it will be obvious that by swinging the crank in the proper direction the frame may be moved to the screen or moved away therefrom. Each of the crank arms 11 is provided at the end remote from the shaft with a journal pin 14 and each of these pins is journaled in a bearing 15 on the frame 8. The shafts 12 are journaled in bushings 16 in the thresher body, and the cranks 11 have hubs which are secured to the shafts 12, as, for instance, by keying or the like.

In operation, when the screen 3 becomes foul and choked, the crank 13 is grasped and swung in the manner indicated in Fig. 4 to bring the screen portion 10 of the frame 8 into contact with the screen portion of the sieve or riddle 3. It will be obvious that the contact of the two screens will clean them from seeds and the like and will keep the sieve clean and in good condition at all times. The device is easily operated, it only being necessary to swing the crank.

In order to hold the cleaner in adjusted position, the crank is provided with a latch lever 17, which operates a catch 18 mounted to slide on the crank, and this catch is adapted to engage the teeth of a quadrant 19 secured to the thresher frame. By means of the catch the cleaner may be held in inoperative position out of contact with the spring.

We claim:

In a thresher, the combination with the swinging screen thereof, of a cleaner comprising a relatively stationary screen covered frame disposed above said swinging screen, crank arms supporting said cleaner frame, and means for adjusting and holding the crank arms to bring the cleaner frame in position to be engaged by said swinging screen at the forward limit of its movement, whereby material upon the swinging screen will be wiped backwardly therealong and be pressed therethrough.

FRANKLIN A. BRADSHAW.
CHARLES C. WILLIS.